United States Patent
Nara et al.

(10) Patent No.: US 12,094,223 B2
(45) Date of Patent: Sep. 17, 2024

(54) INFORMATION PROCESSING APPARATUS, AND RECORDING MEDIUM

(71) Applicant: Faurecia Clarion Electronics Co., Ltd., Saitama (JP)

(72) Inventors: Norikazu Nara, Saitama (JP); Tetsuro Murakami, Saitama (JP); Naoto Sakata, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 321 days.

(21) Appl. No.: 17/536,649

(22) Filed: Nov. 29, 2021

(65) Prior Publication Data
US 2022/0172493 A1    Jun. 2, 2022

(30) Foreign Application Priority Data
Nov. 30, 2020 (JP) .................................. 2020-197881

(51) Int. Cl.
| | |
|---|---|
| *G06V 20/59* | (2022.01) |
| *B60W 40/08* | (2012.01) |
| *G06V 40/10* | (2022.01) |
| *G06V 40/16* | (2022.01) |

(52) U.S. Cl.
CPC ........... *G06V 20/593* (2022.01); *B60W 40/08* (2013.01); *G06V 40/103* (2022.01); *G06V 40/165* (2022.01)

(58) Field of Classification Search
CPC .... G06V 20/593; G06V 40/165; B60W 40/08
See application file for complete search history.

(56) References Cited

U.S. PATENT DOCUMENTS

| | | | |
|---|---|---|---|
| 2017/0158102 A1 | 6/2017 | Murray | |
| 2021/0001796 A1* | 1/2021 | Kudo | ........................ A61B 5/18 |
| 2021/0114541 A1* | 4/2021 | Hosokawa | ........... G06V 40/103 |
| 2021/0237620 A1* | 8/2021 | Mizoi | .................... B60N 2/829 |

FOREIGN PATENT DOCUMENTS

| | | |
|---|---|---|
| JP | 2008-230366 A | 10/2008 |
| JP | 2017-003789 A | 1/2017 |
| JP | 2019-194062 A | 11/2019 |
| JP | 2021-066276 A | 4/2021 |
| WO | 2019/180876 A1 | 9/2019 |
| WO | WO-2019168057 A1 * | 9/2019 ......... G06K 9/00255 |

OTHER PUBLICATIONS

Japanese Office Action mailed by Japanese Patent Office dated on Feb. 13, 2024 in corresponding Japanese patent application No. 2020-197881.

* cited by examiner

*Primary Examiner* — Shaghayegh Azima
(74) *Attorney, Agent, or Firm* — IP Business Solutions, LLC

(57) ABSTRACT

A sitting height estimation ECU is mounted on a vehicle and includes: an acquisition unit configured to acquire an image of a driver sitting in a driver's seat; a position detection unit configured to detect a position of a landmark on a face of the driver from the image; a crown estimation unit configured to estimate a position of a crown of the driver on the basis of the position of the landmark; and a sitting height estimation unit configured to estimate a sitting height of the driver on the basis of an estimation result obtained by the crown estimation unit.

12 Claims, 8 Drawing Sheets

FIG.5

| CONDITION | SITTING POSITION | | CORRECTION COEFFICIENT | |
|---|---|---|---|---|
| PS1≧PSH1<br>PS2≧PSH2<br>PS3≧PSH3 | SP1<br>SITTING BACK | | γ1<br>1/1.045 | |
| PS1<PSH1<br>PS2≧PSH2<br>PS3≧PSH3 | SP2<br>SITTING NORMALLY | | γ2<br>1 | |
| PS1<PSH1<br>PS2<PSH2<br>PS3≧PSH3 | SP3<br>SITTING ON EDGE | | γ3<br>1.045 | |

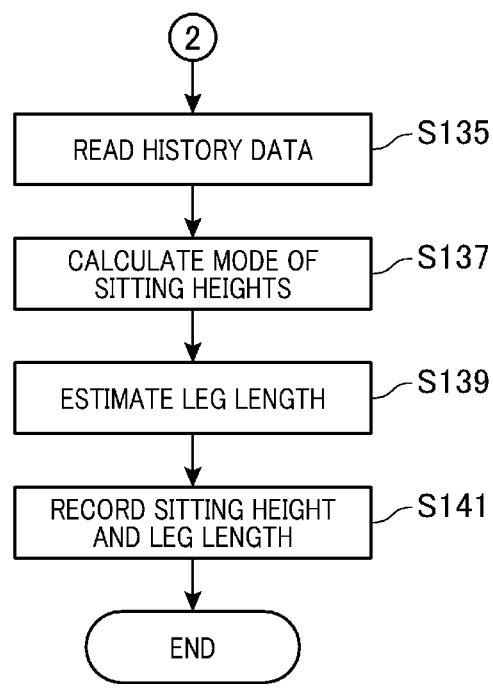

INFORMATION PROCESSING APPARATUS, AND RECORDING MEDIUM

INCORPORATION BY REFERENCE

The present application claims priority under 35 U.S.C. § 119 to Japanese Patent Application No. 2020-197881 filed on Nov. 30, 2020. The content of the application is incorporated herein by reference in its entirety.

BACKGROUND OF THE INVENTION

Field of the Invention

The present invention relates to an information processing apparatus, a program, and a recording medium.

Description of the Related Art

For example, International Publication No. WO 2019-180876 discloses a conventional technique that estimates the physique of an occupant of a vehicle.

A physique estimation device described in International Publication No. WO 2019-180876 determines a seat on which the occupant is seated on the basis of face information of the occupant detected from an image capturing a vehicle compartment, calculates the occupant's sitting height using a difference between a reference position for the determined seat and a face position, and estimates the occupant's physique on the basis of the calculated occupant's sitting height.

SUMMARY OF THE INVENTION

However, in International Publication No. WO 2019-180876, since the occupant's sitting height is calculated using the difference between the reference position for the seat and the face position, there is a possibility that the sitting height cannot be accurately estimated.

It is an object of the present invention to provide an information processing apparatus capable of accurately estimating a sitting height and a program.

In order to achieve the above object, an information processing apparatus of an embodiment is mounted on a vehicle and includes: an acquisition unit configured to acquire an image of a driver sitting in a driver's seat; a position detection unit configured to detect a position of a landmark on a face of the driver from the image; a crown estimation unit configured to estimate a position of a crown of the driver on the basis of the position of the landmark; and a sitting height estimation unit configured to estimate a sitting height of the driver on the basis of an estimation result obtained by the crown estimation unit.

Further, in order to achieve the above object, a program of the embodiment causes a computer mounted on a vehicle to function as: an acquisition unit configured to acquire an image of a driver sitting in a driver's seat; a position detection unit configured to detect a position of a landmark on a face of the driver from the image; a crown estimation unit configured to estimate a position of a crown of the driver on the basis of the position of the landmark; and a sitting height estimation unit configured to estimate a sitting height of the driver on the basis of an estimation result obtained by the crown estimation unit.

According to the embodiment, since the position of the crown of the driver is estimated on the basis of the position of the landmark on the face of the driver, and the sitting height of the driver is estimated on the basis of an estimation result thereof, the sitting height can be accurately estimated.

BRIEF DESCRIPTION OF THE DRAWINGS

FIG. 5 is a table showing an example of a method for correcting the sitting height based on a sitting position;

FIG. 8 is a flowchart showing the example of the process of the sitting height estimation ECU.

DETAILED DESCRIPTION OF THE PREFERRED EMBODIMENT

Hereinbelow, an embodiment will be described with reference to the drawings.

Figure 1:
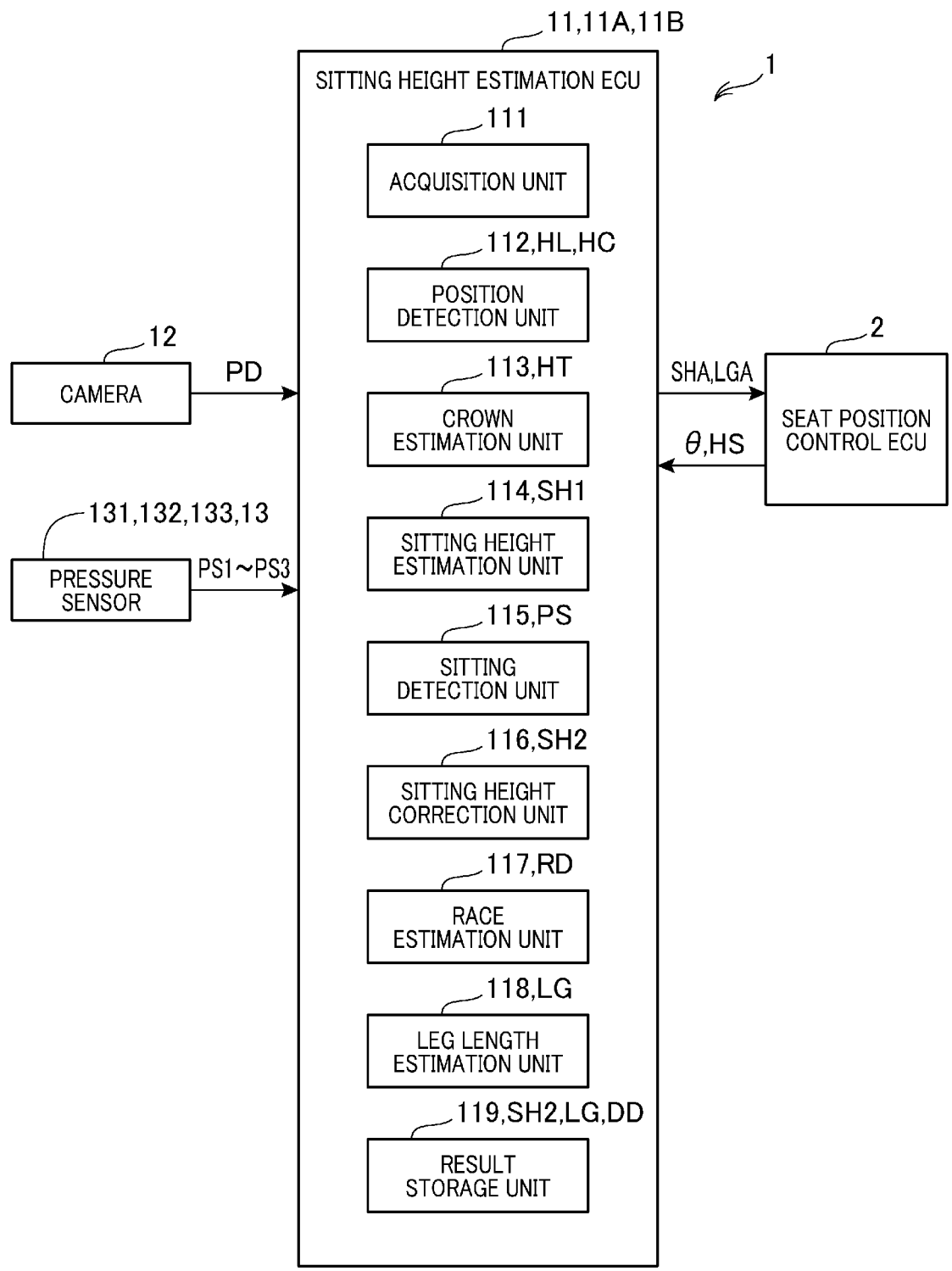
FIG. 1 is a diagram showing an example of the configuration of a sitting height estimation device according to an embodiment.

FIG. 1 is a diagram illustrating an example of the configuration of a sitting height estimation device 1 according to the present embodiment. The sitting height estimation device 1 is mounted on a vehicle.

The sitting height estimation device 1 estimates a sitting height SH1 of a driver DV sitting in a driver's seat ST. As shown in FIG. 1, the sitting height estimation device 1 includes a sitting height estimation electronic control unit (ECU) 11, a camera 12, and a pressure sensor 13.

The sitting height estimation ECU 11 communicates with a seat position control ECU 2 through an in-vehicle network.

The sitting height estimation ECU 11 corresponds to an example of "the information processing apparatus".

Figure 2:
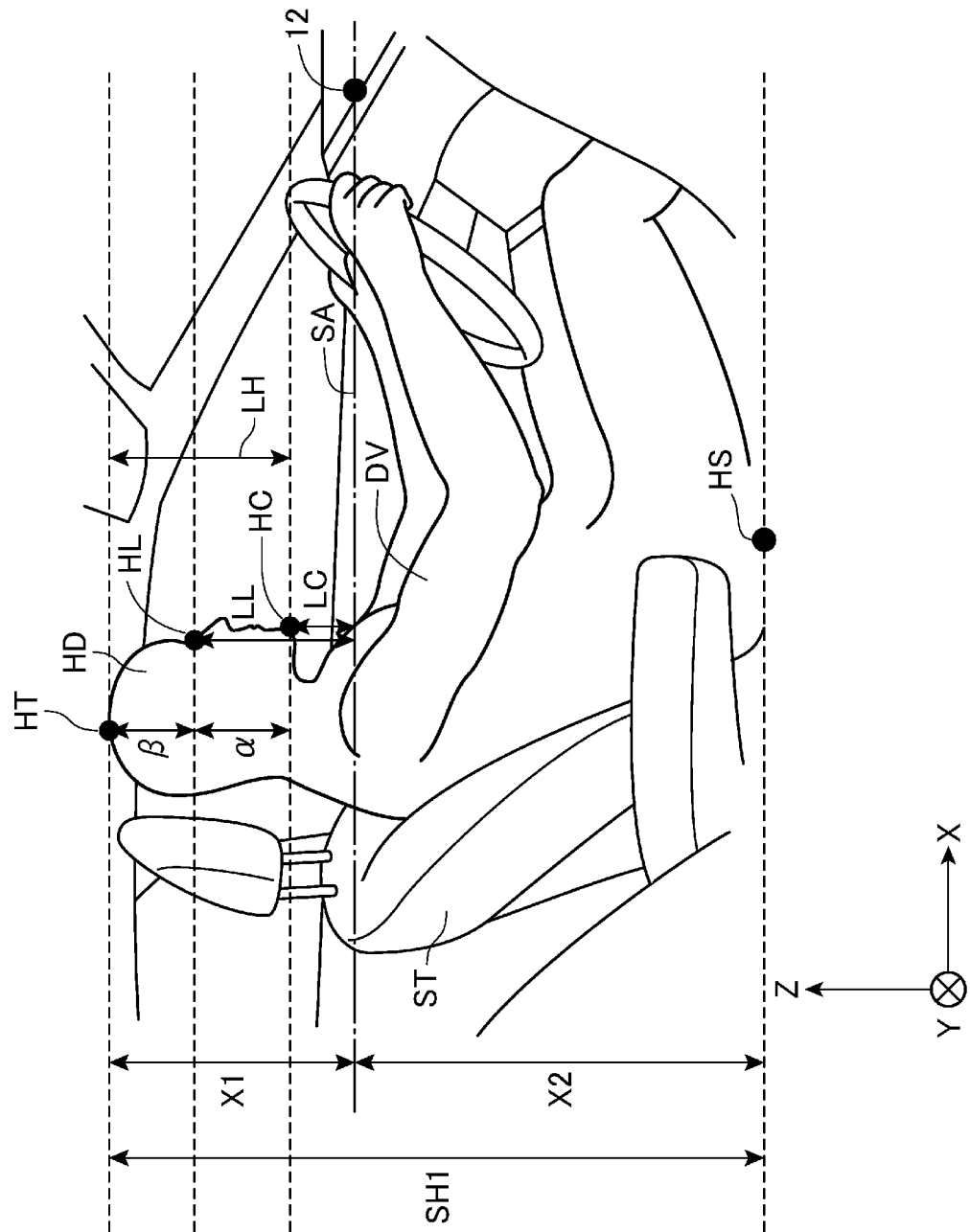
FIG. 2 is a side view showing an example of a method for estimating a sitting height.

The camera 12 captures an image PD of the driver DV in accordance with an instruction from the sitting height estimation ECU 11. The camera 12 is disposed, for example, on a dashboard of the vehicle as shown in FIG. 2.

The pressure sensor 13 detects a pressing force PS of the driver DV against a seat pan ST1 of the driver's seat ST. The pressure sensor 13 is disposed on the seat pan ST1 of the driver's seat ST. The pressure sensor 13 includes a first pressure sensor 131, a second pressure sensor 132, and a third pressure sensor 133.

In the following description, when the first pressure sensor 131, the second pressure sensor 132, and the third pressure sensor 133 are not distinguished from each other, these sensors may be referred to as the pressure sensor 13.

The driver's seat ST, the seat pan ST1, the first pressure sensor 131, the second pressure sensor 132, and the third pressure sensor 133 will be described later with reference to FIG. 4.

The seat position control ECU 2 includes a processor and a memory, and adjusts a position in a front-rear direction, a position HS in a height direction, and a tilt angle θ of a backrest ST2 of the driver's seat ST on the basis of a sitting height SH2 of the driver DV estimated by the sitting height estimation ECU 11 and a leg length LG. The front direction indicates a traveling direction of the vehicle. Note that each of the position in the front-rear direction, the position HS in the height direction, and the tilt angle θ of the backrest ST2 of the driver's seat ST is, for example, adjustable by driving a motor.

The seat position control ECU 2 outputs the position HS in the height direction and the tilt angle θ of the backrest ST2 of the driver's seat ST to the sitting height estimation ECU 11.

The position HS in the height direction and the tilt angle θ of the backrest ST2 of the driver's seat ST will be described later with reference to FIG. 4.

Figure 3:
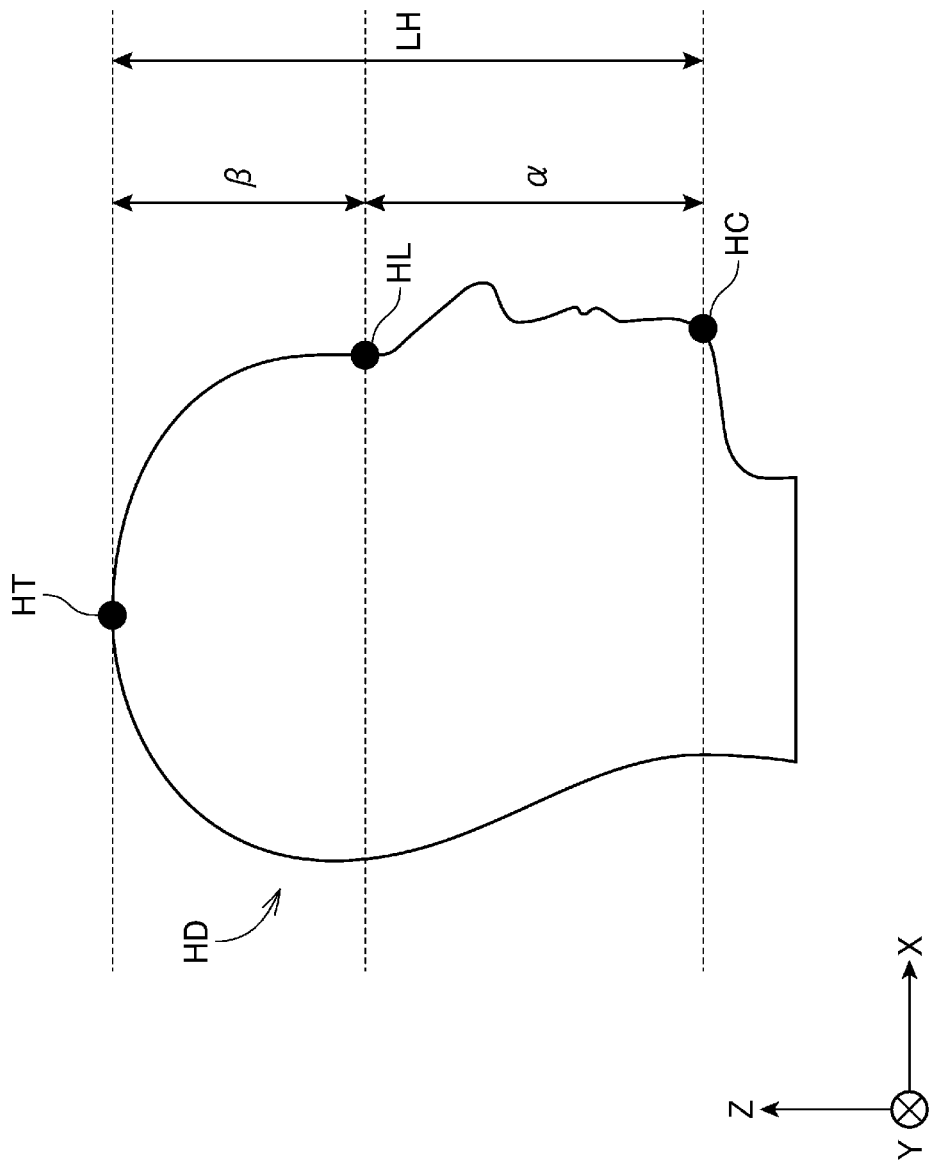
FIG. 3 is a side view showing an example of a method for estimating a size in a height direction of a head.
Figure 4:
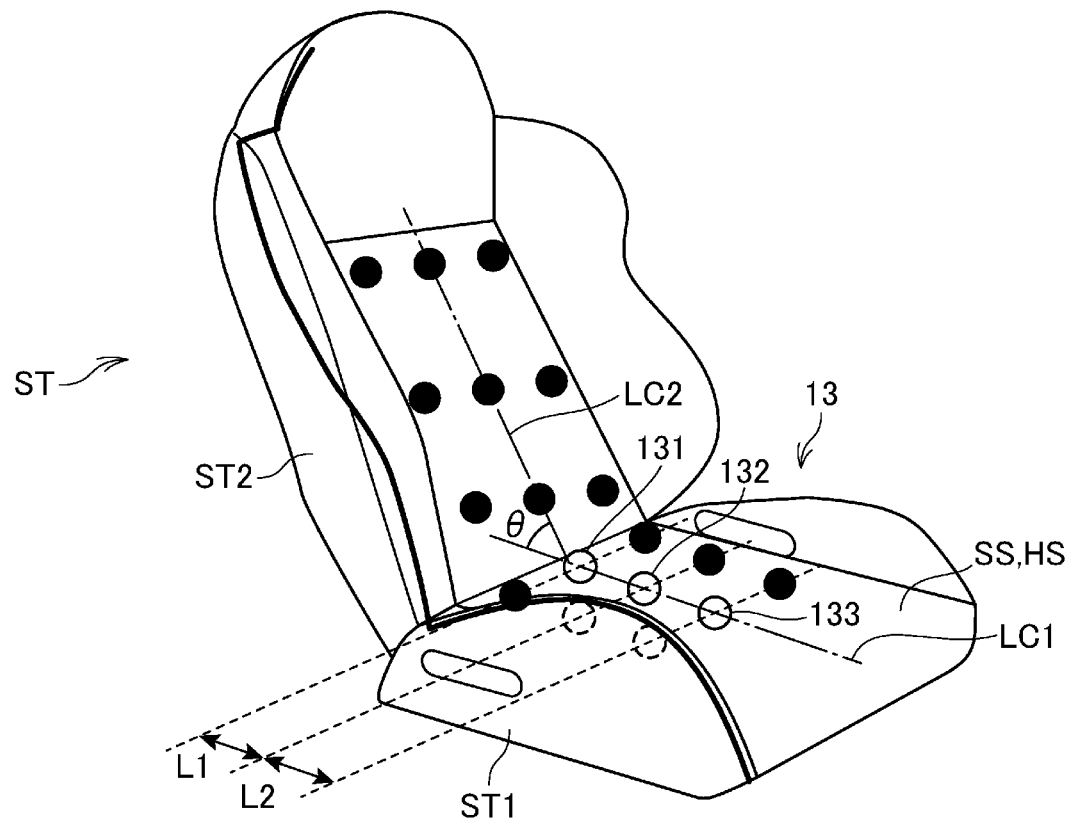
FIG. 4 is a perspective view showing an example of disposition of a pressure sensor.

The front-rear direction corresponds to an X-axis direction of FIGS. 2 to 4. The front direction corresponds to a positive direction of an X axis.

The height direction corresponds to a Z-axis direction of FIGS. 2 to 4.

The driver's seat ST is configured in such a manner that the position in the front-rear direction, the position HS in the height direction, and the tilt angle θ of the backrest ST2 of the driver's seat ST are adjustable by the driver DV through an operation of, for example, a lever, a switch, or a button.

The seat position control ECU 2 outputs, to the sitting height estimation ECU 11, the position HS in the height direction and the tilt angle θ of the backrest ST2 of the driver's seat ST.

The seat position control ECU 2 may adjust the position of a steering wheel on the basis of the sitting height SH2 of the driver DV estimated by the sitting height estimation ECU 11 and the leg length LG.

The sitting height estimation ECU 11 includes a processor 11A such as a central processing unit (CPU) or a microprocessing unit (MPU) and a memory 11B such as a read only memory (ROM) or a random access memory (RAM).

The sitting height estimation ECU 11 includes, in addition to these members, an interface circuit for connection with, for example, sensors and a peripheral device and an in-vehicle network communication circuit that communicates with another in-vehicle device through the in-vehicle network.

The processor 11A corresponds to an example of "the computer".

The processor 11A of the sitting height estimation ECU 11 functions as an acquisition unit 111, a position detection unit 112, a crown estimation unit 113, a sitting height estimation unit 114, a sitting detection unit 115, a sitting height correction unit 116, a race estimation unit 117, a leg length estimation unit 118, and a result storage unit 119.

Specifically, the processor 11A of the sitting height estimation ECU 11 functions as the acquisition unit 111, the position detection unit 112, the crown estimation unit 113, the sitting height estimation unit 114, the sitting detection unit 115, the sitting height correction unit 116, the race estimation unit 117, and the leg length estimation unit 118 by executing a control program stored in the memory 11B. Further, the processor 11A of the sitting height estimation ECU 11 causes the memory 11B to function as the result storage unit 119 by executing the control program stored in the memory 11B.

The result storage unit 119 stores, as history data, the sitting height SH2 and the leg length LG in association with identification information DD for identifying the driver DV. The sitting height SH2 is written to the result storage unit 119 by the sitting height correction unit 116 every time the sitting height correction unit 116 calculates the corrected sitting height SH2. The leg length LG is written to the result storage unit 19 by the leg length estimation unit 118 every time the leg length estimation unit 118 calculates the leg length LG.

The result storage unit 119 stores a sitting height SHA and a leg length LGA in association with the identification information DD for identifying the driver DV. The sitting height SHA indicates the mode of the sitting heights SH2. The leg length LGA is estimated on the basis of the sitting height SHA and written to the result storage unit 119 by the leg length estimation unit 118.

The sitting height SHA and the leg length LGA are output to the seat position control ECU 2. The seat position control ECU 2 includes a processor and, by a function of the processor, adjusts the position in the front-rear direction, the position HS in the height direction, and the tilt angle θ of the backrest ST2 of the driver's seat ST on the basis of the sitting height SHA and the leg length LGA.

The acquisition unit 111 acquires the image PD of the driver DV sitting in the driver's seat ST. In the present embodiment, the acquisition unit 111 causes the camera 12 to capture an image of the driver DV to generate the image PD when the vehicle is traveling (that is, a traveling speed is equal to or higher than a predetermined speed). Further, the acquisition unit 111 acquires the image PD generated by the camera 12. The predetermined speed is, for example, 5 km/h.

The image PD includes an image of the head HD of the driver DV.

The position detection unit 112 detects a position HL of a landmark on the face of the driver DV from the image PD. For example, the position detection unit 112 detects the position HL of the landmark on the face of the driver DV from the image PD when the driver DV is facing the front.

In the present embodiment, the position detection unit 112 detects the position HL in the height direction of a selion of the driver DV from the image PD. The selion indicates the most recessed point of a nose root part within a median plane. The selion corresponds to an example of "the landmark". Specifically, the position detection unit 112 detects a distance LL between the selion and a reference plane SA. The reference plane SA is a plane including the camera 12 and parallel to a horizontal plane of a body of the vehicle.

The position HL is represented by, for example, coordinate information of (x, y, z), where x is an X coordinate, y is a Y coordinate, and z is a Z coordinate. Note that information in all three dimensions is not necessarily required. For example, the position HL may be represented by Z-coordinate information.

Further, the position detection unit 112 detects a position HC in the height direction of a chin bottom of the face of the driver DV from the image PD. Specifically, the position detection unit 112 detects a distance LC between the chin bottom of the face of the driver DV and the reference plane SA.

The position HC is represented by, for example, coordinate information of (x, y, z) as with the position HL.

The position HL, the position HC, the distance LL, the distance LC, and the reference plane SA will be described later with reference to FIG. 2.

The crown estimation unit 113 estimates a position HT of the crown of the driver DV on the basis of the position HL of the landmark on the face of the driver DV. In other words, the crown estimation unit 113 estimates a size LH in the height direction of the head HD of the driver DV.

The position HT is represented by, for example, coordinate information of (x, y, z) as with the position HL.

A method for estimating the position HT of the crown will be described later with reference to FIGS. 2 and 3.

The sitting height estimation unit 114 estimates the sitting height SH1 of the driver DV on the basis of an estimation result obtained by the crown estimation unit 113.

A method for estimating the sitting height SH1 will be described later with reference to FIGS. 2 and 3.

The sitting detection unit 115 detects a sitting position SP of the driver DV on the basis of a detection result obtained by the pressure sensor 13 disposed on the driver's seat ST.

A method for detecting the sitting position SP will be described later with reference to FIGS. 4 and 5.

The sitting height correction unit 116 corrects the sitting height SH1 of the driver DV on the basis of the sitting position SP of the driver DV.

In the present embodiment, the sitting height correction unit 116 obtains a correction coefficient γ on the basis of the sitting position SP of the driver DV and calculates the corrected sitting height SH2 using the following formula (1).

$$SH2 = SH1 \times \gamma \tag{1}$$

As the sitting position SP of the driver DV moves in the front direction, the correction coefficient γ increases.

A method for correcting the sitting height SH1 will be described later with reference to FIGS. 4 and 5.

Note that, in the following description, when the uncorrected sitting height SH1 and the corrected sitting height SH2 are not distinguished from each other, the sitting height SH1 and the sitting height SH2 may be referred to as the sitting height SH.

The race estimation unit 117 estimates race RD of the driver DV on the basis of skin color of the driver DV. In the present embodiment, the race estimation unit 117 detects the skin color of the driver DV on the basis of the image PD. Then, the race estimation unit 117 estimates which race the driver DV belongs to: African RD1, European RD2, or Asian RD3 on the basis of the skin color of the driver DV.

The leg length estimation unit 118 estimates the leg length LG of the driver DV on the basis of an estimation result obtained by the sitting height estimation unit 114 and an estimation result obtained by the race estimation unit 117. In the present embodiment, the leg length LG of the driver DV is estimated on the basis of the corrected sitting height SH2 corrected by the sitting height correction unit 116 and the estimation result obtained by the race estimation unit 117.

When the race estimation unit 117 determines that the driver DV belongs to the African RD1, the leg length LG is estimated using, for example, the following formula (2).

$$LG = SH2 \times 53/47 \tag{2}$$

When the race estimation unit 117 determines that the driver DV belongs to the European RD2, the leg length LG is estimated using, for example, the following formula (3)

$$LG = SH2 \times 52/48 \tag{3}$$

When the race estimation unit 117 determines that the driver DV belongs to the Asian RD3, the leg length LG is estimated using, for example, the following formula (4).

$$LG = SH2 \times 51/49 \tag{4}$$

Note that, in the present embodiment, the leg length LG is the difference between the height and the sitting height SH.

Next, the method for estimating the position HT of the crown and the method for estimating the sitting height SH1 will be described with reference to FIGS. 2 and 3.

FIG. 2 is a side view illustrating an example of the method for estimating the sitting height. FIG. 3 is a side view illustrating an example of the method for estimating the size LH in the height direction of the head HD.

Note that an X axis, a Y axis, and a Z axis which are perpendicular to each other are shown in each of FIGS. 2 to 4. The X axis represents the front-rear direction of the vehicle. The Y axis represents the right-left direction of the vehicle. The Z axis represents the up-down direction of the vehicle. The positive direction of the X axis corresponds to the front direction of the vehicle, that is, the traveling direction. The positive direction of the Y axis corresponds to the left direction of the vehicle. The positive direction of the Z axis corresponds to the up direction of the vehicle.

FIG. 3 is a side view of the head HD of the driver DV. FIG. 3 also shows the position HL of the selion of the driver DV, the position HC of the chin bottom of the face of the driver DV, and the position HT of the crown of the driver DV.

The position HL and the position HC are detected by the position detection unit 112.

A lower head distance α is the distance between the position HL and the position HC in the height direction (that is, the Z-axis direction). An upper head distance β is the distance between the position HT and the position HL in the height direction. A relationship represented by the following formula (5) holds between the lower head distance α and the upper head distance β.

$$\alpha:\beta = 0.52:0.48 \tag{5}$$

Thus, the size LH in the height direction of the head HD of the driver DV is calculated by the following formula (6).

$$LH = \alpha/0.52 \tag{6}$$

The lower head distance α corresponds to an example of "the distance between the position of the landmark and the position of the chin bottom of the driver". The upper head distance β corresponds to an example of "the distance between the position of the landmark and the position of the crown of the driver".

Next, the method for estimating the sitting height SH1 will be described with reference to FIG. 2. Note that a process described below is executed by the crown estimation unit 113 and the sitting height estimation unit 114. Further, FIG. 2 shows a case where the tilt angle θ of the backrest ST2 is 90 degrees for convenience's sake.

As shown in FIG. 2, the lower head distance α is the distance between the position HL and the position HC in the height direction and thus calculated by the following formula (7).

$$\alpha = LL - LC \qquad (7)$$

The distance LL is the distance between the position HL of the selion and the reference plane SA. The distance LC is the distance between the position HC of the chin bottom of the face of the driver DV and the reference plane SA. The distance LL and the distance LC are detected by the position detection unit 112.

The following formula (8) is obtained by substituting formula (7) into formula (6).

$$LH = (LL - LC)/0.52 \qquad (8)$$

On the other hand, the sitting height SH1 is calculated by the following formula (9).

$$SH1 = X1 + X2 \qquad (9)$$

The first distance X1 is the distance between the reference plane SA and the position HT in the height direction. The reference plane SA is a plane including the camera 12 and parallel to the horizontal plane of the body of the vehicle (that is, the X axis and the Y axis). The second distance X2 is the distance between the position HS of the driver's seat ST and the reference plane SA in the height direction. The position HS is input from the seat position control ECU 2.

The first distance X1 is obtained by the following formula (10) as shown in FIG. 2.

$$X1 = LC + LH \qquad (10)$$

On the other hand, the distance X2 is obtained from the position in the height direction of the camera 12 (that is, the reference plane SA) and the position HS in the height direction of the driver's seat ST.

That is, the crown estimation unit 113 calculates the size LH in the height direction of the head HD of the driver DV using formula (8). The sitting height estimation unit 114 calculates the first distance X1 using formula (10) and calculates the sitting height SH1 using formula (9).

As described above with reference to FIGS. 2 and 3, the sitting height estimation unit 114 estimates the sitting height SH1 on the basis of the position HL of the selion of the driver DV and the position HC of the chin bottom of the face of the driver DV, the position HL and the position HC being detected by the position detection unit 112. Thus, the sitting height SH1 can be accurately estimated with a simple process.

Note that, when the tilt angle θ of the backrest ST2 is not 90 degrees, a sitting height SH0 calculated assuming that the tilt angle θ is 90 degrees may be corrected on the basis of the tilt angle θ. For example, the sitting height SH1 may be estimated using the following formula (11) from the sitting height SH0 calculated assuming that the tilt angle θ is 90 degrees.

$$SH1 = SH0/\sin(\theta) \qquad (11)$$

Next, the method for correcting the sitting height SH1 based on the sitting position SP will be described with reference to FIGS. 4 and 5.

FIG. 4 is a perspective view showing an example of disposition of the pressure sensor 13.

As shown in FIG. 4, the driver's seat ST includes the seat pan ST1 and the backrest ST2. The driver DV sits in the seat pan ST1, and the seat pan ST1 supports the driver DV.

The backrest ST is disposed at the tilt angle θ relative to the seat pan ST1. The tilt angle θ is configured to be adjustable by the driver DV through an operation of, for example, a lever, a switch, or a button. The tilt angle θ is adjusted in accordance with an instruction of the seat position control ECU 2.

The driver's seat ST is configured to be adjustable in the front-rear direction (X-axis direction) and the up-down direction (Z-axis direction). The position in the front-rear direction and the position HS in the up-down direction of the driver's seat ST are adjusted by the driver DV through an operation of, for example, a lever, a switch, or a button. The position in the front-rear direction and the position HS in the up-down direction of the driver's seat ST are adjusted in accordance with an instruction of the seat position control ECU 2.

The position HS in the up-down direction of the driver's seat ST is the position in the up-down direction of an upper face SS of the seat pan ST1.

The pressure sensor 13 is disposed on a front face (that is, the face on the positive-direction side of the X axis) of the backrest ST2 and the upper face SS (that is, the face on the positive-direction side of the Z axis) of the seat pan ST1.

The pressure sensor 13 detects the pressing force PS from the driver DV.

The pressure sensor 13 includes the first pressure sensor 131, the second pressure sensor 132, and the third pressure sensor 133. The first pressure sensor 131, the second pressure sensor 132, and the third pressure sensor 133 are disposed on a center line LC1. The center line LC1 indicates a center position of the upper face SS of the seat pan ST1 in the width direction (that is, the Y-axis direction). The center line LC1 is parallel to the X axis.

A center line LC2 indicates a center position of the front face of the backrest ST2 in the width direction (that is, the Y-axis direction). The tilt angle θ is an angle between the center line LC1 and the center line LC2.

The first pressure sensor 131 is disposed on the upper face SS of the seat pan ST1 at a position coupled to the front face of the backrest ST2. In other words, the first pressure sensor 131 is disposed at a position where the center line LC1 and the center line LC2 intersect.

A space L1 between the first pressure sensor 131 and the second pressure sensor 132 is equal to a space L2 between the second pressure sensor 132 and the third pressure sensor 133. Each of the space L1 and the space L2 is, for example, 4 cm.

FIG. 5 is table 300 showing an example of the method for correcting the sitting height SH1 based on the sitting position SP.

Table 300 includes a condition 310, the sitting position SP, and the correction coefficient γ from left to right columns.

The condition 310 includes a first pressure PS1, a second pressure SP2, a third pressure PS3, a first threshold PSH1, a second threshold PSH2, and a third threshold PSH3.

The first pressure PS1 is a value detected by the first pressure sensor 131. The second pressure PS2 is a value detected by the second pressure sensor 132. The third pressure PS3 is a value detected by the third pressure sensor 133.

The first threshold PSH1 is an example of a threshold for the first pressure PS1. The second threshold PSH2 is an example of a threshold for the second pressure PS2. The third threshold PSH3 is an example of a threshold for the third pressure PS3.

For example, when the following formulae (12-1) to (12-3) are satisfied, the sitting detection unit 115 detects that the sitting position SP is a first sitting position SP1. The first sitting position SP1 is the sitting position SP of the driver DV "sitting back".

$$PS1 \geq PSH1 \quad (12\text{-}1)$$

$$PS2 \geq PSH2 \quad (12\text{-}2)$$

$$PS3 \geq PSH3 \quad (12\text{-}3)$$

Then, the sitting height correction unit 116 sets a first correction coefficient γ1 as the correction coefficient γ. The first correction coefficient γ1 is, for example, "1/1.045".

When the following formulae (13-1) to (13-3) are satisfied, the sitting detection unit 115 detects that the sitting position SP is a second sitting position SP2. The second sitting position SP2 is the sitting position SP of the driver DV "sitting normally".

$$PS1 < PSH1 \quad (13\text{-}1)$$

$$PS2 \geq PSH2 \quad (13\text{-}2)$$

$$PS3 \geq PSH3 \quad (13\text{-}3)$$

Then, the sitting height correction unit 116 sets a second correction coefficient γ2 as the correction coefficient γ. The second correction coefficient γ2 is, for example, "1".

When the following formulae (14-1) to (14-3) are satisfied, the sitting detection unit 115 detects that the sitting position SP is a third sitting position SP3. The third sitting position SP3 is the sitting position SP of the driver DV "sitting on the edge".

$$PS1 < PSH1 \quad (14\text{-}1)$$

$$PS2 < PSH2 \quad (14\text{-}2)$$

$$PS3 \geq PSH3 \quad (14\text{-}3)$$

Then, the sitting height correction unit 116 sets a third correction coefficient γ3 as the correction coefficient γ. The third correction coefficient γ3 is, for example, "1.045".

The sitting height correction unit 116 calculates the corrected sitting height SH2 using the set correction coefficient γ and the following formula (15). Here, for convenience's sake, formula (1) is restated as formula (15).

$$SH2 = SH1 \times \gamma \quad (15)$$

As described above with reference to FIGS. 4 and 5, the sitting detection unit 115 detects the sitting position SP of the driver DV on the basis of a detection result obtained by the pressure sensor 13, and the sitting height correction unit 116 corrects the sitting height SH1 of the driver DV on the basis of the sitting position SP of the driver DV to calculate the corrected sitting height SH2. Thus, it is possible to appropriately execute correction of the sitting height SH relating to the sitting position SP.

Figure 6:
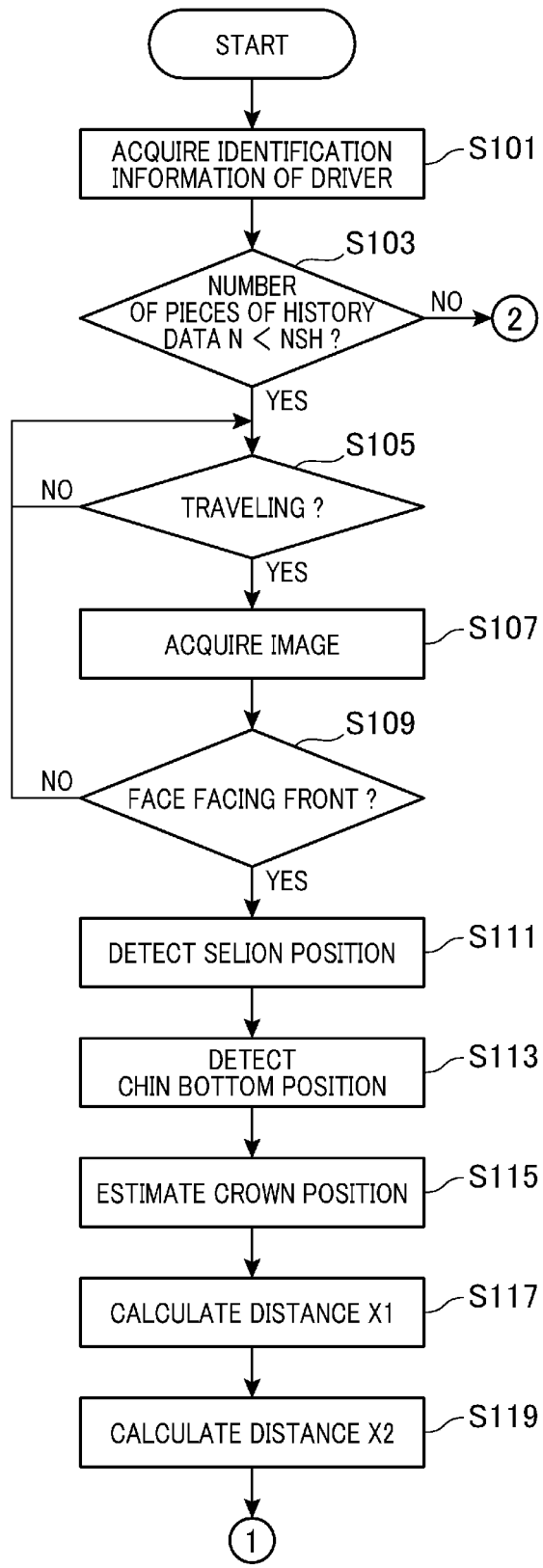
FIG. 6 is a flowchart showing an example of a process of a sitting height estimation ECU.
Figure 7:
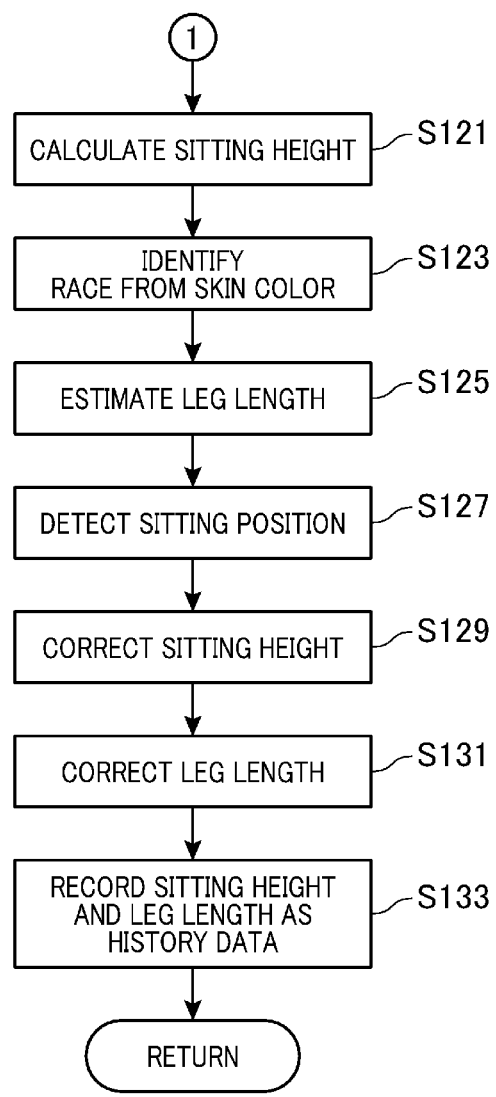
FIG. 7 is a flowchart showing the example of the process of the sitting height estimation ECU.

FIGS. 6 to 8 are flowcharts showing an example of a process of the sitting height estimation ECU 11.

First, in step S101, the sitting height estimation ECU 11 acquires the identification information DD of the driver DV. For example, the sitting height estimation ECU 11 acquires the identification information DD of the driver DV in accordance with an operation of a user.

Next, in step S103, the sitting height estimation ECU 11 determines whether the number of pieces of history data N is less than a number threshold NSH. The number threshold NSH is, for example, 100.

When the sitting height estimation ECU 11 determines that the number of pieces of history data N is not less than the number threshold NS (step S103; NO), the process proceeds to step S135 shown in FIG. 8. When the sitting height estimation ECU 11 determines that the number of pieces of history data N is less than the number threshold NSH (step S103; YES), the process proceeds to step S105.

Then, in step S105, the acquisition unit 111 determines whether the vehicle is traveling. For example, the acquisition unit 111 determines whether the vehicle is traveling on the basis of whether the traveling speed of the vehicle is equal to or higher than the predetermined speed.

When the acquisition unit 111 determines that the vehicle is not traveling (step S105; NO), the process is brought into a standby state. When the acquisition unit 111 determines that the vehicle is traveling (step S105; YES), the process proceeds to step S107.

Then, in step S107, the acquisition unit 111 acquires the image PD of the driver DV sitting in the driver's seat ST. That is, the acquisition unit 111 causes the camera 12 to capture an image of the driver DV to generate the image PD. Further, the acquisition unit 111 acquires the image PD generated by the camera 12.

Next, in step S109, the position detection unit 112 determines whether the driver DV is facing the front on the basis of the image PD.

When the position detection unit 112 determines that the driver DV is not facing the front (step S109; NO), the process returns to step S105. When the position detection unit 112 determines that the driver DV is facing the front (step S109; YES), the process proceeds to step S111.

Then, in step S111, the position detection unit 112 detects the position HL of the selion of the driver DV from the image PD. In other words, the position detection unit 112 detects the distance LL between the position HL of the selion and the reference plane SA from the image PD.

Next, in step S113, the position detection unit 112 detects the position HC of the chin bottom of the driver DV from the image PD. In other words, the position detection unit 112 detects the distance LC between the position HC of the chin bottom of the face of the driver DV and the reference plane SA from the image PD.

Next, in step S115, the crown estimation unit 113 estimates the position HT of the crown of the driver DV on the basis of the position HL and the position HC.

Next, in step S117, the sitting height estimation unit 114 estimates the first distance X1 on the basis of an estimation result obtained by the crown estimation unit 113. For example, the sitting height estimation unit 114 calculates the first distance X1 using formulae (8) and (10) described above.

Next, in step S119, the sitting height estimation unit 114 calculates the second distance X2 on the basis of the position in the height direction of the camera 12 and the position HS in the height direction of the driver's seat ST. Note that the sitting height estimation unit 114 acquires the position HS from the seat position control ECU 2.

Next, as shown in FIG. 7, in step S121, the sitting height estimation unit 114 estimates the sitting height SH1 of the driver DV. For example, the sitting height estimation unit 114 calculates the sitting height SH1 of the driver DV using formula (9) described above.

Next, in step S123, the race estimation unit 117 estimates the race RD of the driver DV on the basis of the skin color of the driver DV. For example, the race estimation unit 117 detects the skin color of the driver DV on the basis of the image PD and estimates which race the driver DV belongs to: the African RD1, the European RD2, or the Asian RD3, for example, on the basis of the skin color.

Next, in step S125, the leg length estimation unit 118 estimates the leg length LG of the driver DV on the basis of an estimation result obtained by the sitting height estimation unit 114 and an estimation result obtained by the race estimation unit 117. For example, the leg length estimation unit 118 estimates the leg length LG of the driver DV by replacing the sitting height SH2 with the sitting height SH1 in each of formulae (2) to (4) described above.

Next, in step S127, the sitting detection unit 115 detects the sitting position SP of the driver DV on the basis of a detection result obtained by the pressure sensor 13 disposed on the driver's seat ST.

Next, in step S129, the sitting height correction unit 116 corrects the sitting height SH1 of the driver DV on the basis of the sitting position SP of the driver DV to calculate the corrected sitting height SH2.

Next, in step S131, the leg length estimation unit 118 corrects the leg length LG of the driver DV on the basis of a correction result obtained by the sitting height correction unit 116 and the estimation result obtained by the race estimation unit 117. For example, the leg length estimation unit 118 calculates the corrected leg length LG of the driver DV using formulae (2) to (4) described above.

Next, in step S133, the sitting height correction unit 116 writes, as history data, the corrected sitting height SH2 to the result storage unit 119 in association with the identification information DD for identifying the driver DV. Further, the leg length estimation unit 118 writes, as history data, the corrected leg length LG to the result storage unit 119 in association with the identification information DD for identifying the driver DV. Then, the process returns.

When the answer is NO in step S103 of FIG. 6, as shown in FIG. 8, the sitting height estimation ECU 11 reads history data corresponding to the identification information DD from the result storage unit 119 in step S135.

Next, in step S137, the sitting height estimation ECU 11 calculates the mode of the sitting heights SH2 as the sitting height SHA.

Next, in step S139, the leg length estimation unit 118 estimates, as the leg length LGA, the leg length LG corresponding to the sitting height SHA on the basis of the estimation result obtained by the race estimation unit 117.

Next, in step S141, the sitting height estimation ECU 11 writes the sitting height SHA and the leg length LGA to the result storage unit 119 in association with the identification information DD, and the process is then finished.

As described above with reference to FIGS. 6 to 8, the mode of the sitting heights SH2 the number of which corresponds to the number threshold NSH (e.g., 100), the sitting heights SH2 being stored as the history data in the result storage unit 119, is calculated as the sitting height SHA. Thus, the sitting height SHA can be more accurately estimated.

The leg length estimation unit 118 estimates, as the leg length LGA, the leg length LG corresponding to the sitting height SHA on the basis of the estimation result obtained by the race estimation unit 117. Thus, the leg length LGA can be more accurately estimated.

Although the present embodiment describes the case where the sitting height estimation ECU 11 calculates, as the sitting height SHA, the mode of the sitting heights SH2 the number of which corresponds to the number threshold NSH (e.g., 100), the present invention is not limited thereto. It is sufficient that the sitting height estimation ECU 11 calculate the sitting height SHA on the basis of the sitting heights SH2 the number of which corresponds to the number threshold NSH. For example, the sitting height estimation ECU 11 may calculate the mean of the sitting heights SH2 the number of which corresponds to the number threshold NSH as the sitting height SHA or may calculate the median of the sitting heights SH2 the number of which corresponds to the number threshold NSH as the sitting height SHA.

Although, in the present embodiment, the sitting height estimation ECU 11 acquires the identification information DD of the driver DV in accordance with an operation of a user, the present invention is not limited thereto. It is sufficient that the sitting height estimation ECU 11 acquire the identification information DD of the driver DV. For example, the sitting height estimation ECU 11 may acquire the identification information DD of the driver DV on the basis of the image PD. Specifically, the sitting height estimation ECU 11 may execute face recognition processing on the image PD to acquire the identification information DD of the driver DV. In this case, no user operation is required. Thus, the convenience for users can be improved.

As described above with reference to FIGS. 1 to 8, the sitting height estimation ECU 11 of the present embodiment is mounted on the vehicle and includes the acquisition unit 111 which acquires the image PD of the driver DV sitting in the driver's seat ST, the position detection unit 112 which detects the position HL of the landmark on the face of the driver DV from the image PD, the crown estimation unit 113 which estimates the position HT of the crown of the driver DV on the basis of the position HL of the landmark, and the sitting height estimation unit 114 which estimates the sitting height SH1 of the driver DV on the basis of the estimation result obtained by the crown estimation unit 113.

That is, the position HL of the landmark on the face of the driver DV is detected from the image PD, the position HT of the crown of the driver DV is estimated on the basis of the position HL of the landmark, and the sitting height SH1 of the driver DV is estimated on the basis of the position HT of the crown.

Thus, the position HT of the crown of the driver DV can be accurately estimated. Accordingly, the sitting height SH1 of the driver DV can be accurately estimated.

The position detection unit 112 detects the position HC of the chin bottom of the face of the driver DV from the image PD, and the crown estimation unit 113 estimates the position HT of the crown on the basis of the ratio between the lower head distance α between the position HL of the landmark and the position HC of the chin bottom and the upper head distance β between the position HL of the landmark and the position HT of the crown of the driver DV.

Thus, since the position HT of the crown is estimated on the basis of the ratio between the lower head distance α and the upper head distance β, the position HT of the crown can be accurately estimated by appropriately selecting the landmark. For example, when the selion is selected as the landmark, the position HT of the crown can be accurately estimated because formula (5) describe above holds. Thus, the sitting height SH1 of the driver DV can be accurately estimated.

The sitting height estimation ECU 11 further includes the race estimation unit 117 which estimates the race RD of the driver DV on the basis of the skin color of the driver DV and the leg length estimation unit 118 which estimates the leg length LG of the driver DV on the basis of the estimation result obtained by the sitting height estimation unit 114 and the estimation result obtained by the race estimation unit 117.

Thus, since the race RD of the driver DV is estimated on the basis of the skin color of the driver DV, the race RD can be appropriately estimated. Since the leg length LG of the driver DV is estimated on the basis of the sitting height SH1 and the race RD, the leg length LG can be accurately estimated. Since, for example, the leg length LG is estimated using formulae (2) to (4) described above, the leg length LG can be accurately estimated.

The sitting height estimation ECU 11 further includes the sitting height correction unit 116 which corrects the sitting height SH1 of the driver DV on the basis of the sitting position SP of the driver DV.

Thus, since the sitting height SH1 of the driver DV is corrected on the basis of the sitting position SP of the driver DV, the corrected sitting height SH2 can be accurately calculated. Since, for example, the correction coefficient γ is calculated on the basis of the sitting position SP of the driver DV, and the corrected sitting height SH2 is calculated using formula (1) described above, the corrected sitting height SH2 can be accurately calculated.

The sitting height estimation ECU 11 further includes the sitting detection unit 115 which detects the sitting position SP of the driver DV on the basis of the detection result obtained by the pressure sensor 13 disposed on the driver's seat ST.

Since the sitting position SP of the driver DV is detected on the basis of the detection result obtained by the pressure sensor 13 disposed on the driver's seat ST, the sitting position SP can be appropriately detected. Since, for example, the correction coefficient γ is calculated on the basis of the first to third pressures PS1 to PS3 as described above with reference to FIG. 5, the correction coefficient γ can be appropriately calculated. Thus, the corrected sitting height SH2 can be accurately calculated.

The acquisition unit 111 acquires the image PD when the traveling speed of the vehicle is equal to or higher than the predetermined speed.

Thus, the image PD of the driver DV sitting in the driver's seat ST in a correct posture can be acquired by appropriately setting the predetermined speed. For example, when the vehicle is stationary, the driver DV may be operating a smart phone or a navigation system. Thus, the driver DV may not be sitting in the driver's seat ST in a correct posture. When the driver DV is not sitting in the driver's seat ST in a correct posture in this manner, the image PD is not acquired. Thus, the image PD can be appropriately acquired.

The position detection unit 112 detects the position HL of the landmark when the driver DV is facing the front.

Thus, since the position HL of the landmark is detected when the driver DV is facing the front, the position HL of the landmark can be accurately detected.

The control program of the present embodiment causes the processor 11A mounted on the vehicle to function as the acquisition unit 111 which acquires the image PD of the driver DV sitting in the driver's seat ST, the position detection unit 112 which detects the position HL of the landmark on the face of the driver DV from the image PD, the crown estimation unit 113 which estimates the position HT of the crown of the driver DV on the basis of the position HL of the landmark, and the sitting height estimation unit 114 which estimates the sitting height SH1 of the driver DV on the basis of the estimation result obtained by the crown estimation unit 113.

Thus, the control program of the present embodiment can achieve effects similar to the effects obtained by the sitting height estimation ECU 11 of the present embodiment.

The above present embodiment merely describes, as an example, an aspect of the present invention, and any modifications and applications can be made without departing from the gist of the present invention.

For example, FIG. 1 is a diagram showing the elements classified according to main processing details for easy understanding of the present invention. The elements may be classified into more elements according to the processing details. Alternatively, the elements may be classified in such a manner that one element execute more processes.

The process of each element may be executed by a piece of hardware or a plurality of pieces of hardware.

The process of each element may be implemented by one program or a plurality of programs.

Although the present embodiment describes the case where "the information processing apparatus" is the sitting height estimation ECU 11, the present invention is not limited thereto. It is sufficient that "the information processing apparatus" include a processor and a memory. For example, "the information processing apparatus" may be a personal computer including a processor and a memory, a tablet computer including a processor and a memory, or a smart phone including a processor and a memory.

Although the present embodiment describes the case where the landmark on the face of the driver DV is the selion, the present invention is not limited thereto. The landmark on the face of the driver DV may be a tip position of the nose or a center position between the left eye and the right eye.

Although the present embodiment describes the case where the lower head distance α and the upper head distance β satisfy formula (5), the present invention is not limited thereto. It is sufficient that the ratio between the lower head distance α and the upper head distance β be a predetermined ratio. For example, the ratio between the lower head distance α and the upper head distance β may be 12:11 or 14:13.

The ratio between the lower head distance α and the upper head distance β may be set on the basis of at least one of the race RD and whether the driver DV is man or woman.

Although, in the present embodiment, the race estimation unit 117 estimates the race RD of the driver DV on the basis of the skin color of the driver DV, the present invention is not limited thereto. It is sufficient that the race estimation unit 117 estimate the race RD of the driver DV on the basis of the image PD. For example, the race estimation unit 117 may execute image processing on the face of the driver DV to estimate the race RD of the driver DV.

Although the present embodiment describes the case where the race estimation unit 117 estimates which race the driver DV belongs to: the African RD1, the European RD2, or the Asian RD3, the present invention is not limited thereto. It is sufficient that the race estimation unit 117 estimate the race RD of the driver DV. For example, the number of races RD may be four or more. For example, the Asian RD3 may be further classified into Japanese, Chinese, Malay, Polynesian, and Micronesian.

The leg length estimation unit 118 can more accurately estimate the leg length LG of the driver DV as the number of races RD increases.

Although the present embodiment describes the case where the sitting detection unit 115 detects the sitting position SP on the basis of values detected by the first to third pressure sensors 131 to 133, the present invention is not limited thereto. It is sufficient that the sitting detection unit 115 detect the sitting position SP on the basis of a value detected by the pressure sensor 13.

The sitting detection unit 115 may detect the sitting position SP on the basis of a value detected by one pressure sensor 13 or values detected by two pressure sensors 13. As the number of pressure sensors 13 decreases, the process of the sitting height estimation ECU 11 can be more simplified.

The sitting detection unit 115 may detect the sitting position SP on the basis of values detected by four or more pressure sensors 13. As the number of pressure sensors 13 increases, the sitting detection unit 115 can more accurately detect the sitting position SP.

Although the present embodiment describes the case where the sitting detection unit 115 detects which one of the first to third sitting positions SP1 to SP3 the sitting position SP is, the present invention is not limited thereto. It is sufficient that the sitting detection unit 115 detect the sitting position SP on the basis of the value detected by the pressure sensor 13.

The sitting detection unit 115 may detect which one of four or more sitting positions SP the sitting position SP is. As the number of sitting positions SP increases, the sitting detection unit 115 can more accurately detect the sitting position SP.

Although, in the present embodiment, the control program is stored in the memory 11B of the sitting height estimation ECU 11, the control program may be configured in the form of another recording medium or a transmission medium that transmits the control program.

A magnetic or optical recording medium or a semiconductor memory device can be used as the recording medium. Specifically, examples of the recording medium include portable or fixed recording media such as a flexible disk, an HDD, a compact disk read only memory (CD-ROM), a DVD, a Blu-ray (registered trademark) disc, a magneto-optical disk, a flash memory, and a card type recording medium. The recording medium described above may be a nonvolatile storage device such as a RAM, a ROM, or an HDD included in the sitting height estimation device 1.

The control program may be downloaded by the sitting height estimation ECU 11 from a server device communicably connected to the sitting height estimation ECU 11 through a network.

For example, the processing units of the flowchart shown in FIGS. 6 to 8 are divided according to main processing details for easy understanding of the processes of the sitting height estimation ECU 11. The present invention is not limited to the dividing way of the processing units or the names of the processing units. The processes of the sitting height estimation ECU 11 may be divided into more processing units according to the processing details. Further, the processes of the sitting height estimation ECU 11 may be divided in such a manner that one processing unit includes more processes.

REFERENCE SIGNS LIST 1 sitting height estimation device
11 sitting height estimation ECU (information processing apparatus)
11A processor (computer)
11B memory
111 acquisition unit
112 position detection unit
113 crown estimation unit
114 sitting height estimation unit
115 sitting detection unit
116 sitting height correction unit
117 race estimation unit
118 leg length estimation unit
119 result storage unit
12 camera
13 pressure sensor
131 first pressure sensor
132 second pressure sensor
133 third pressure sensor
2 seat position control ECU
DD identification information
DV driver
HC position of chin bottom
HD head
HL position of landmark (selion)
HS position of upper face of seat pan
HT position of crown
LG, LGA leg length
LH size in height direction of head
PD image
PS pressing force
RD race
SA reference plane
SH, SH0, SH1, SH2, SHA sitting height
SP sitting position
SS upper face
ST driver's seat
ST1 seat pan
ST2 backrest
X1 first distance
X2 second distance
$\alpha$ lower head distance (distance between position of landmark and position of chin bottom of driver)
$\beta$ upper head distance (distance between position of landmark and position of crown of driver)
$\gamma$ correction coefficient
$\theta$ tilt angle

What is claimed is:
1. An information processing apparatus mounted on a vehicle, the information processing apparatus comprising:
a processor, wherein the processor includes
an acquisition unit configured to acquire an image of a driver sitting in a driver's seat;
a position detection unit configured to detect a position of a landmark on a face of the driver from the image;
a crown estimation unit configured to estimate a position of a crown of the driver on the basis of the position of the landmark; and a sitting height estimation unit configured to estimate a sitting height of the driver on the basis of an estimation result obtained by the crown estimation unit, wherein the position detection unit detects a position of a chin bottom of the face of the driver from the image, and the crown estimation unit estimates the position of the crown on the basis of a ratio between a distance between the position of the landmark and the position of the chin bottom and a distance between the position of the landmark and the position of the crown of the driver.

2. The information processing apparatus according to claim 1, wherein the processor further includes a race estimation unit configured to estimate race of the driver on the basis of skin color of the driver; and a leg length estimation unit configured to estimate a leg length of the driver on the basis of an estimation result obtained by the sitting height estimation unit and an estimation result obtained by the race estimation unit.

3. The information processing apparatus according to claim 1, wherein the processor further includes a sitting height correction unit configured to correct the sitting height of the driver on the basis of a sitting position of the driver.

4. The information processing apparatus according to claim 3, wherein the processor further includes a sitting detection unit configured to detect the sitting position of the driver on the basis of a detection result obtained by a pressure sensor disposed on the driver's seat.

5. The information processing apparatus according to claim 1, wherein the acquisition unit acquires the image when a traveling speed of the vehicle is equal to or higher than a predetermined speed.

6. The information processing apparatus according to claim 1, wherein the position detection unit detects the position of the landmark when the driver is facing front.

7. A non-transitory computer readable recording medium on which a control program is recorded, the control program being executed by a processor of a computer mounted on a vehicle, the control program being for causing the processor to function as:

an acquisition unit configured to acquire an image of a driver sitting in a driver's seat;

a position detection unit configured to detect a position of a landmark on a face of the driver from the image;

a crown estimation unit configured to estimate a position of a crown of the driver on the basis of the position of the landmark; and a sitting height estimation unit configured to estimate a sitting height of the driver on the basis of an estimation result obtained by the crown estimation unit;

wherein the position detection unit detects a position of a chin bottom of the face of the driver from the image, and the crown estimation unit estimates the position of the crown on the basis of a ratio between a distance between the position of the landmark and the position of the chin bottom and a distance between the position of the landmark and the position of the crown of the driver.

8. The non-transitory computer readable recording medium according to claim 7, further comprising: a race estimation unit configured to estimate race of the driver on the basis of skin color of the driver; and a leg length estimation unit configured to estimate a leg length of the driver on the basis of an estimation result obtained by the sitting height estimation unit and an estimation result obtained by the race estimation unit.

9. The non-transitory computer readable recording medium according to claim 7, further comprising: a sitting height correction unit configured to correct the sitting height of the driver on the basis of a sitting position of the driver.

10. The non-transitory computer readable recording medium according to claim 9, further comprising: a sitting detection unit configured to detect the sitting position of the driver on the basis of a detection result obtained by a pressure sensor disposed on the driver's seat.

11. The non-transitory computer readable recording medium according to claim 7, wherein the acquisition unit acquires the image when a traveling speed of the vehicle is equal to or higher than a predetermined speed.

12. The non-transitory computer readable recording medium according to claim 7, wherein the position detection unit detects the position of the landmark when the driver is facing front.

* * * * *